June 27, 1961 J. C. HEWITT, JR 2,989,841
CONTROL DEVICE
Filed July 22, 1957 3 Sheets-Sheet 1

INVENTOR.
JOHN C. HEWITT, Jr.
BY
ATTORNEY

INVENTOR.
JOHN C. HEWITT, Jr.
BY
ATTORNEY

June 27, 1961 J. C. HEWITT, JR 2,989,841
CONTROL DEVICE

Filed July 22, 1957 3 Sheets-Sheet 3

INVENTOR.
JOHN C. HEWITT, Jr.
BY
ATTORNEY

United States Patent Office 2,989,841
Patented June 27, 1961

2,989,841
CONTROL DEVICE
John C. Hewitt, Jr., Long Beach, Calif., assignor to Robertshaw-Fulton Controls Company, Richmond, Va., a corporation of Delaware
Filed July 22, 1957, Ser. No. 673,420
4 Claims. (Cl. 60—23)

This invention relates to control devices and more particularly to automatically operated controls for supplying energy to temperature regulating apparatus and the like.

An object of this invention is to utilize a heat motor as the operating means in a control device.

Another object of this invention is to operate the actuating means of a control device by the action of a heat motor.

A further object of this invention is to support a heat motor adjustably on a control device for operating the snap-action mechanism thereof.

An additional object is to produce a fail-safe control device which is of simple, compact and rugged construction and relatively silent in operation.

This invention has another object in that a ballast means is incorporated in a thermal-electric motor as a control for the same.

This invention has a further object in that the contraction and expansion of a thermal element of a heat motor is utilized to move a control means between controlling positions in response to the heat output of such heat motor.

This invention is characterized in that an operable connection between a thermal-electric motor and the actuating means of a control device transmits a force to such actuating means in response to thermal contraction and expansion of a thermally responsive element. Adjusting and locking means is associated with the thermally responsive element to set and lock the same in a predetermined position. The heating element of the thermal-electric motor is electrically operated by automatic means so that when a desired temperature in the space to be heated is attained, the electric circuit for the heating element is automatically opened causing the control device to cut off the supply of energy to the burner which heats such space.

Other objects and advantages will become apparent from the following description taken in connection with the accompanying drawings wherein.

Figure 1:
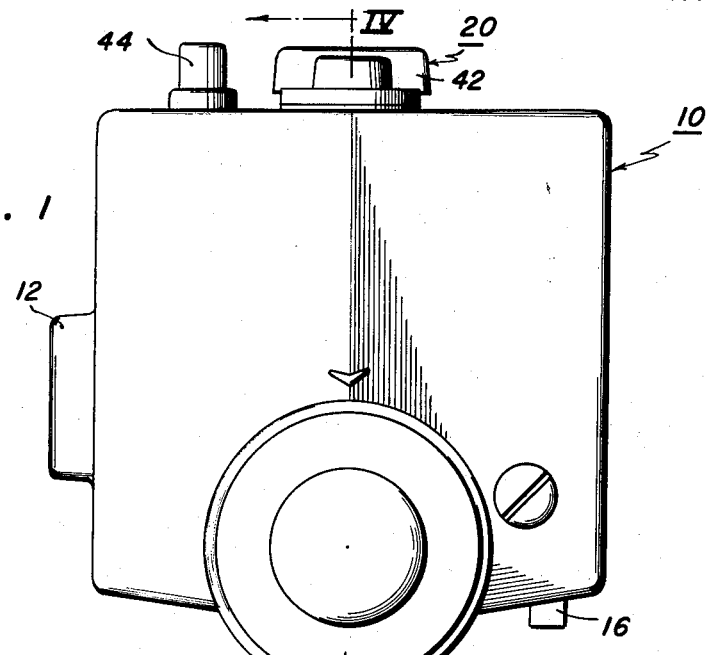
FIG. 1 is a front elevation view of a control device embodying this invention.
Figure 2:
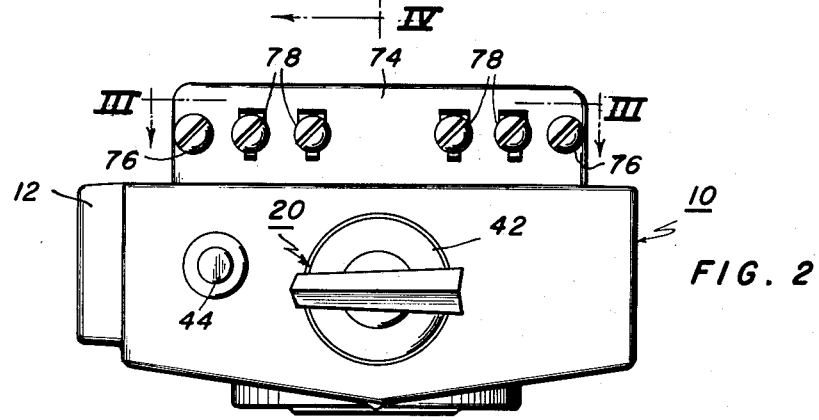
FIG. 2 is a top plan view of the device shown in FIG. 1.

It is to be understood that this invention may be utilized in many different types of control devices but for the purposes of description it is combined with a control device for supplying fuel to appliances such as space heaters, furnaces and the like. Such a control device, as is illustrated in FIGS. 1 and 2, includes a casing, indicated generally at 10, having an inlet port 12, a main outlet port 14 (FIG. 4) for supplying fuel to a main burner, and a pilot outlet port 16 for supplying fuel to a pilot burner. A fuel passage (not shown) establishes communication between inlet port 12 and a manually operable shut-off valve, indicated generally at 20. A conical bore 22 is formed in the upper part of casing 10 and seats a correspondingly shaped shut-off cock 24 of valve 20. The lower portion of shut-off cock 24 has an axial cylindrical bore 26 with a transverse opening 28 in its wall for alignment with the fuel passage. The lower portion of shut-off cock 24 also provides communication between the inlet fuel passage and a pilot fuel passage (not shown). The upper portion of shut-off cock 24 has a generally cylindrical stem portion 30 which projects exteriorly of the casing 10.

A spring 32 encircles a part of stem portion 30 and is mounted in compression between a recess 34 formed in the shut-off cock 24 and a washer 36. The spring 32 and washer 36 are held in place by a cover plate 38 which is fastened to the top of casing 10. An adjusting shaft assembly 39 is axially biased in a bore in stem portion 30, which is in alignment with and has a smaller diameter than bore 26. A sleeve valve 40, comprising a split-sleeve of flexible material, is secured to the lower end of shaft assembly 39 and is positioned in bore 26 to engage the wall thereof. A manually operable knob 42 fits over the stem portion 30 and shaft assembly 39 for unitary rotation thereof to a desired flow setting. Sleeve valve 40 is normally positioned against the wall of bore 26 but by first removing knob 42, it can be separately rotated to partially close the opening 28 and restrict the flow therethrough.

A thermoelectric safety valve (not shown) is positioned in the passageway between inlet port 12 and shut-off cock 24. A magnet reset button 44 for such a safety valve is shown protruding from the top of casing 10. Thermoelectric safety devices of this type are well known in the art and a detailed drawing and description of the safety valve structure as contained in casing 10 are deemed unnecessary.

A cover 46 and gasket 48 are secured to the front wall of casing 10 to seal a valve chamber 52 therein and which communicates with cylindrical bore 26 of shut-off cock 24. Control means in the form of a disc-shaped valve member 54 is positioned in chamber 52 to cooperate with an annular valve seat 56 projecting inwardly from the rear wall of casing 10. Valve member 54 is biased toward valve seat 56 by a coil spring 58 which is mounted in compression between valve member 54 and the internal surface of cover 46.

A valve stem 60 has one end suitably fixed to valve member 54 and a free end with an adjustable set screw 61 projecting through a bushing 62 formed on a boss on the rear wall of casing 10 to extend into operative engagement with actuating means 64. The actuating means is in the form of a snap-acting mechanism in which a clicker disc moves between inoperative and operative positions through an overcenter position with a snap action in response to an applied operating force. The snap-acting mechanism 64 is retained in a recess formed in the rear wall of casing 10 by a retainer and seal assembly 65 and includes an operating button 66 extending rearwardly of casing 10 for a purpose to be described hereinafter. The biasing spring 58 and the snap-acting mechanism 64 cooperate to form movable means for moving valve member 54 between its controlling positions relative to valve seat 56 to control a flow of fuel from valve chamber 52 to main outlet port 14.

A generally cup-shaped housing 70 may be fabricated as an integral part of casing 10, or, when it is desired to convert an existing control device, housing 70 is secured to the rear wall of casing 10 by any suitable means, such as threaded apertures and screws 72. An electrical terminal board 74 of insulating material is attached to the top of housing 70 by suitable screws 76. Four binding head screws 78 are respectively screwed into four terminal lugs 80 which form connections for appropriate lead wires.

Figure 5:
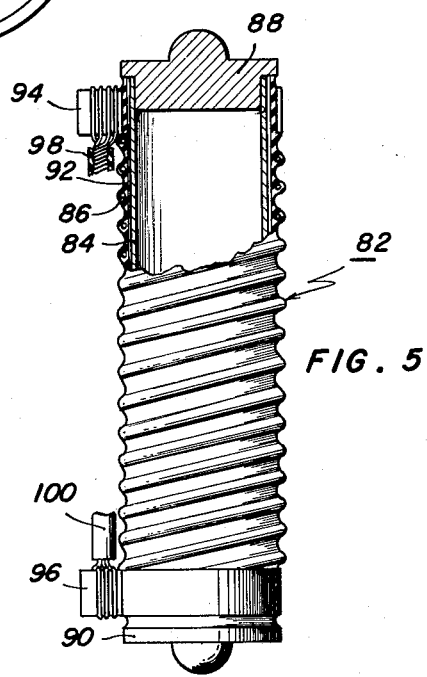
FIG. 5 is an enlarged view with a portion in section of a heat motor shown in FIG. 4.

A thermal-electric motor, indicated generally at 82 in FIG. 5, comprises a thermally responsive element 84 and a heating element 86. Thermally responsive element 84 is a thin-walled tube made of material which has a high thermal coefficient of expansion. Each open end of the tubular member 84 is closed by ball-point end plugs 88 and 90, respectively. A coating of any suitable insulating material, such as mica, forms a sleeve 92 surrounding tubular member 84. Heating element 86 comprises a resistance wire which is spirally wound around tubular member 84 and is embedded in the sleeve 92. The heating coil 86 terminates at each end of tubular member 84 and is welded to end bands 94 and 96 which in turn are welded to lead wires 98 and 100, respectively. Lead wires 98 and 100 extend to terminal board 74 and are welded to appropriate terminal lugs 80.

Figure 3:
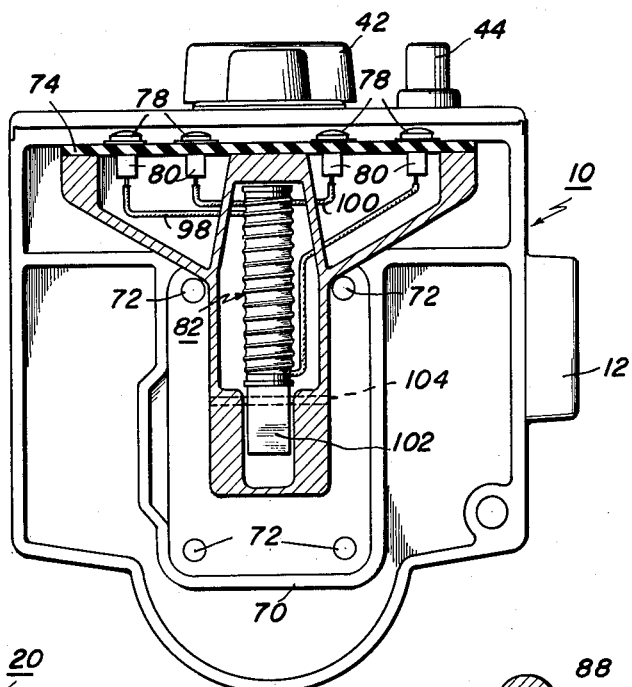
FIG. 3 is a sectional view taken on the line III—III of FIG. 2.

Thermal-electric motor 82, as shown in FIG. 3, is operably positioned in perpendicular relationship to the axis of operating button 66 of the snap-acting mechanism 64. An operable connection between heat motor 82 and the snap-acting mechanism 64 is in the form of a bell crank lever block 102 that is rotatable about pivot pin 104 which in turn is mounted in the opposite side walls of housing 70. One face of lever block 102 bears against the operating button 66 and another face thereof is indented to receive the ball-point end plug 90. The other ball-point end plug 88 is located in an indented adjusting screw 106 which is threaded through the top of housing 70. A lock nut 108 is threaded onto the protruding end of adjusting screw 106 to retain the same in its adjusted position.

The electrical circuitry for this control device has not been shown since it is varied to suit a particular installation. In one satisfactory application, the electrical circuitry included a low voltage, stepdown transformer having a secondary winding connected in series relationship with a room thermostat and the heating element 86 of the heat motor 82.

In the following description of the operation of the control device shown in FIGS. 1 through 5, it is assumed that the thermoelectric safety device is in an operating position and that the shut-off cock 24 is in an open position so that a flow of fuel is supplied to chamber 52. When the temperature of the thermostat is sufficiently high, its contact points are open, no current is flowing in the secondary winding of the transformer, the contracting and expanding member 84 is in its contracted position, the snap-acting mechanism 64 is in its relaxed or inoperative position, and the control valve 54 is closed on its seat 56 by the bias of coil spring 58.

As the temperature drops below the thermostat setting, the thermostatic contacts are closed and electric current then flows in the secondary winding of the transformer. Current in resistance wire 86 increases its temperature to heat the tubular member 84. As tubular member 84 is heated, it expands longitudinally and such movement is transmitted through bell crank lever block 102 to the operating button 66 of the snap-acting mechanism 64. When the snap-acting mechanism 64 passes its overcenter position, it abuts the valve stem adjusting screw 61 causing movement of control valve member 54 to an open position against the bias of coil spring 58. A flow of fuel from chamber 52 and main outlet port 14 is conducted to a main burner to supply heat to the space to be heated. When the space is again heated to the desired temperature, the demand for heat is satisfied and the thermostatic contacts are opened to break the electrical circuit so that tubular member 84 contracts allowing snap-acting mechanism 64 to move to its relaxed position so that valve 54 is biased to its closed position.

Figure 6:
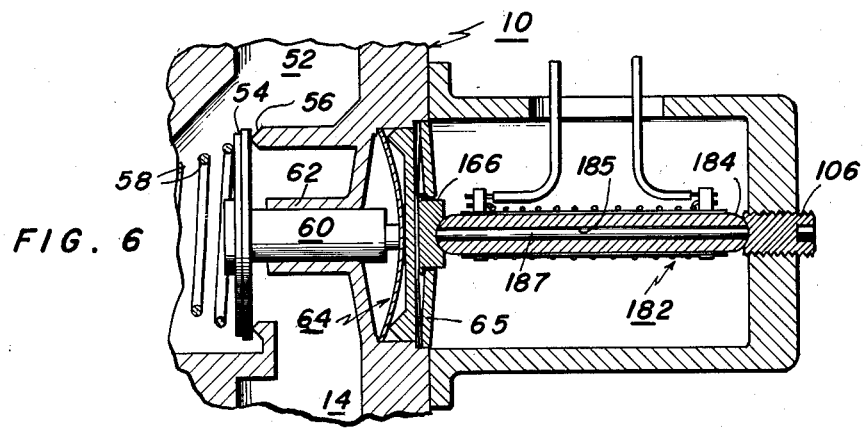
FIG. 6 is a fragmentary section view showing a modification of the device of FIG. 4 with a modified heat motor.

In FIG. 6 a modified form of the control device permits mounting of the heat motor coaxially with valve 54 and snap-acting mechanism 64. In this modification, the snap-acting mechanism has an operating button 166 which is indented to receive the free end of the contracting and expanding member 184 of a thermal-electric motor 182. In this modification, the operable connection between heat motor 182 and snap-acting mechanism 64 is in the form of a direct engagement. The contracting and expanding member 184 is provided with rounded ends, one of which engages the indented operating button 166 and the other of which is confined by the indented adjusting screw 106.

The heat motor 182 shown in FIG. 6 is a modification of that which is shown in FIGS. 1 through 5 in that the thermally responsive element 184 is in rod form having a small diameter bore 185 extending through its longitudinal axis. A highly heat conductive material, such as aluminum in wire form 187, is inserted through the bore 185 so that its ends will maintain contact with operating button 166 and adjusting screw 106 through all phases of heat motor expansion and contraction. The aluminum wire 187 forms a heat ballast means which will more readily conduct heat from the heat motor through the cooperating structure during long periods of "On" time. This tends to prevent the heat motor from over-heating and prevents over-expansion of rod member 184 to eliminate over-stressing of the snap-acting mechanism when it is in its stressed or operating position. This heat ballast means also tends to shorten the control valve "Off" time because of the faster cooling rate.

Figure 7:
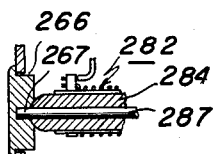
FIG. 7 is a fragmentary section view of a modified form of the heat motor shown in FIG. 6.

A modification of the heat ballast means of FIG. 6 is shown in FIG. 7 wherein the heat motor 282 has a centrally bored rod 284 with an aluminum wire 287 extending axially therethrough. The indented operating button 266 is provided with a cylindrical recess 267 which receives the protruding extension of aluminum wire 287. While only one end of rod member 284 is shown, it is to be understood that the opposite end may have a similar structure cooperating with adjusting screw 106. By extending the highly heat conductive aluminum wire 287 into the cooperating structure, such as operating button 266, the rate of heat transfer from heat motor 282 to the cooperating structure is greater than that attained with the modification of the heat motor 182 in FIG. 6.

Figure 8:
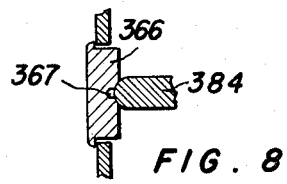
FIG. 8 is a fragmentary section view of another modification of a heat motor.
Figure 9:
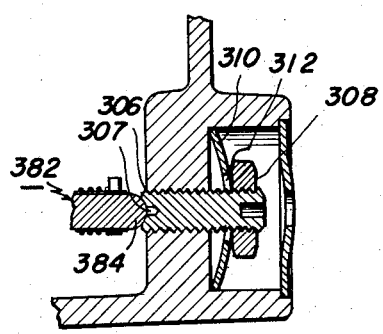
FIG. 9 is a fragmentary section view of the heat motor shown in FIG. 8 with a modified adjusting means.

A further modification of the heat ballast means is illustrated in FIGS. 8 and 9 wherein the expanding and contracting member is a solid rod 384 having opposed ends fitting into indented operating button 366 and the indented adjusting screw 306, respectively. Operating button 366 is provided with a recess 367 and a similar recess 307 is formed in the indented end of adjusting screw 306. Each of the recesses 307 and 367 is filled with a dispersoid of heat conducting material (not shown), such as a silver lacquer paste. With such a dispersoid on each end of expanding and contracting rod member 384, the bearing load on operating button 366 and adjusting screw 306 is more evenly distributed and the heat transfer from the heat motor 382 is facilitated.

A modified form of adjusting screw 306 is also illustrated in FIG. 9 wherein the outer end of screw 306 is provided with a lock nut 308. A square, bowed lock washer 310 has internal teeth 312 which bear against lock nut 308. When lock nut 308 is threaded against bowed lock washer 310, the friction between the threads is increased. Lock nut 308 is restrained from continued forward threading by this lock washer bow pressure and the nut is restrained from unthreading by the internal lock washer teeth. The adjusting screw 306 can thus be threaded in and out with a nearly constant frictional restraint.

Figure 10:
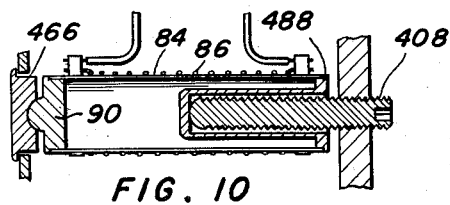
FIG. 10 is a fragmentary section view of a control device showing another modification of a heat motor with another modified adjusting means.

FIG. 10 illustrates another modification of the ballast means for the heat motor, which has been designated as a load ballast means. In this modification, the expanding and contracting tubular member 84 is the same as that illustrated in FIG. 5 with a similar ball end plug 90 engaging an indented operating button 466. The opposite end of tubular member 84 is closed by a cap member 488 which is in tubular form extending approximately half way into tubular member 84. The adjusting screw 408 is of such a length as to extend into abutting relation with the bottom wall of tubular member 488. As is illustrated in FIG. 10, tubular member 488 is remotely positioned from the heating element 86 and is made of a low expanding alloy, such as Invar steel. During initial expansion of the outer thin-walled tubular member 84, the inner tubular member 488, being remote from the resistance heating element 86, will pick up heat and expand at a slower rate. Thus, the initial expansion will operate the snap-acting mechanism but with continued heating the inner tubular member 488 will expand to eliminate overloading of the heat motor and to relieve excessive over-stressing of this snap-acting mechanism. Due to its length, adjusting screw 408 is also made of a low expanding alloy in order to minimize its expansion.

Figure 11:
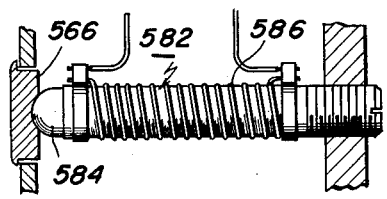
FIG. 11 is a fragmentary section view of another modification of the heat motor shown in FIG. 6 with another modified adjusting means.

Another modification of the ballast means is illustrated in FIG. 11, and has been designated as an electrical ballast means. In this modification, the contracting and expanding element 584 is a solid rod having one rounded end abutting the indented operating button 566. An electrical heating element 586 is formed of any suitable wire whose resistance increases with an increase in temperature, such as a nickel alloy. This electrical ballast means permits a high inrush current to flow so that the contracting and expanding element 584 is heated faster than normal. As the temperature of the wire increases, the resistance increases and the current is automatically diminished.

Figure 4:
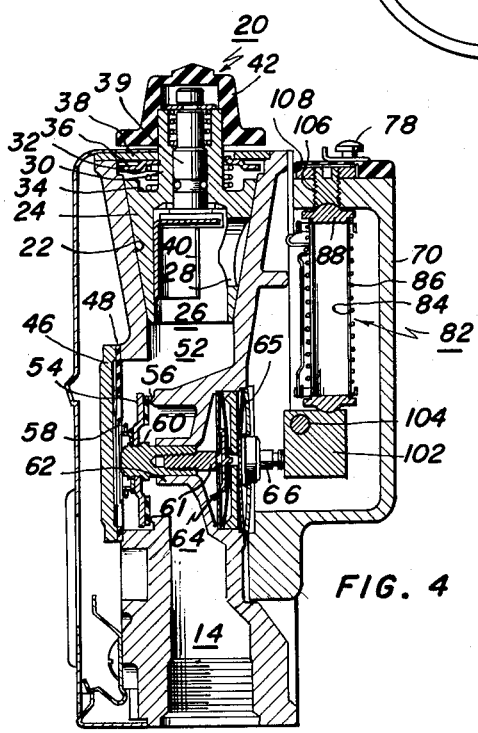
FIG. 4 is a sectional view taken on the line IV—IV of FIG. 1.

It should be noted that the various modifications of the heat motor may be used with either one of the operable connections shown in FIG. 4 or FIG. 6 and that any one of the modified forms of the adjusting means may be incorporated with any particular heat motor. Inasmuch as this invention is subject to many changes by those skilled in the art, it is intended that the above mentioned drawings and the foregoing description thereof be interpreted as illustrative and not in a limiting sense.

I claim:

1. In a thermal-electric motor adapted to actuate a control device, the combination comprising a housing, a thermally responsive element in said housing expanding and contracting in response to temperature variations and having one confined part and an oppositely disposed actuating part, an electric heating element positioned in proximity to said thermally responsive element for actuation thereof, a threaded stud member having one end abutting the confined part of said thermally responsive element and another end extending exteriorly of said housing for adjusting said thermally responsive element to a predetermined position, a nut threaded onto the exterior end of said stud member, and a lock washer positioned between the exterior of said housing and said nut to lock said stud member in abutting relation with the confined part of said thermally responsive element and to lock said nut on said stud member.

2. A thermal-electric motor for a control device comprising an element movable in response to temperature variations, electric heating means positioned in proximity to said element for transferring heat thereto to move the same, means operatively connected to said electric heating means for energizing the same, a cover of insulating material disposed on said element and forming an electric insulator between said heating means and said element, means responsive to the operation of said electric heating means forming a ballast to control the heat transferred to said element, said movable element including a hollow rod member, and said ballast forming means including thermally conductive means having a higher heat conductivity than said rod member and being disposed therein to form heat ballast means.

3. A thermal-electric motor for a control device comprising an element movable in response to temperature variations, electric heating means positioned in proximity to said element for transferring heat thereto to move the same, means operatively connected to said electric heating means for energizing the same, a cover of insulating material disposed on said element and forming an electric insulator between said heating means and said element, means responsive to the operation of said electric heating means forming a ballast to control the heat transferred to said element, said movable element including a rod member, and said ballast forming means including dispersoid means cooperating with said rod member to form heat ballast means.

4. A thermal-electric motor for a control device comprising an element movable in response to temperature variations, electric heating means positioned in proximity to said element for transferring heat thereto to move the same, means operatively connected to said electric heating means for energizing the same, a cover of insulating material disposed on said element and forming an electric insulator between said heating means and said element, means responsive to the operation of said electric heating means forming a ballast to control the heat transferred to said element, said movable element including a tubular member having an open end, and said ballast forming means including a thermally responsive member extending into the open end of said tubular member to form load ballast means.

References Cited in the file of this patent

UNITED STATES PATENTS

| | | |
|---|---|---|
| 1,305,464 | Hastings | June 3, 1919 |
| 1,697,432 | Martin | Jan. 1, 1929 |
| 1,910,230 | Bastian | May 23, 1933 |
| 1,990,747 | Netschert | Feb. 12, 1935 |
| 1,994,470 | Grayson | Mar. 19, 1935 |
| 2,030,932 | Persons | Feb. 18, 1936 |
| 2,211,301 | Taylor | Aug. 13, 1940 |
| 2,232,934 | Baak | Feb. 25, 1941 |
| 2,494,660 | Kathe | Jan. 17, 1950 |
| 2,647,017 | Coulliette | July 28, 1953 |
| 2,729,756 | Euler | Jan. 3, 1956 |
| 2,749,934 | Nester | June 12, 1956 |
| 2,821,837 | McCorkle | Feb. 4, 1958 |
| 2,833,507 | Dube | May 6, 1958 |